United States Patent
Chen (10) Patent No.: US 10,247,094 B2
(45) Date of Patent: Apr. 2, 2019

(54) TURBOCHARGED NATURAL-GAS ENGINE

(71) Applicant: Xiaohui Chen, Zhejiang (CN)

(72) Inventor: Xiaohui Chen, Zhejiang (CN)

( * ) Notice: Subject to any disclaimer, the term of this patent is extended or adjusted under 35 U.S.C. 154(b) by 0 days.

(21) Appl. No.: 16/032,022

(22) Filed: Jul. 10, 2018

(65) Prior Publication Data
US 2018/0320589 A1 Nov. 8, 2018

Related U.S. Application Data (63) Continuation of application No. PCT/CN2016/000434, filed on Aug. 8, 2016.

(30) Foreign Application Priority Data

Mar. 30, 2016 (CN) .......................... 2016 1 0209838

(51) Int. Cl.
| | |
|---|---|
| *F02C 3/04* | (2006.01) |
| *F02M 21/02* | (2006.01) |
| *F02C 7/20* | (2006.01) |
| *F02C 7/36* | (2006.01) |
| *F02B 33/40* | (2006.01) |
| *F02B 43/10* | (2006.01) |

(52) U.S. Cl.
CPC .................. *F02C 3/04* (2013.01); *F02C 7/20* (2013.01); *F02C 7/36* (2013.01); *F02M 21/02* (2013.01); *F02B 33/40* (2013.01); *F02B 43/10* (2013.01); *F02B 2043/103* (2013.01); *Y02T 10/32* (2013.01)

(58) Field of Classification Search
CPC .......... F02B 33/40; F02B 43/10; F02M 21/02
See application file for complete search history.

(56) References Cited

U.S. PATENT DOCUMENTS

| | | | | |
|---|---|---|---|---|
| 4,815,428 A | * | 3/1989 | Bunk .................. | F01L 7/024 |
| | | | | 123/190.2 |
| 2017/0211588 A1 | * | 7/2017 | Kindl .................. | F02B 33/40 |
| 2017/0321599 A1 | * | 11/2017 | Chen .................. | F02C 5/00 |

(Continued)

FOREIGN PATENT DOCUMENTS

| | | |
|---|---|---|
| CN | 2878738 Y | 3/2007 |
| CN | 204458031 U | 7/2015 |

(Continued)

*Primary Examiner* — Lorne E Meade
(74) *Attorney, Agent, or Firm* — Wayne & Ken, LLC; Tony Hom (57) ABSTRACT

A turbocharged natural-gas engine comprises a first drive system (201), a second drive system (202), a third drive system (203) and a fourth drive system (204). The first drive system (201) comprises a gas storage cylinder (72), an eighth motor (65), an axial flow compressor (68), a combustion chamber (71), a first safety device (69), a second safety device (79), an electric ignition device (54), a third drive device (96), a nozzle (102), a turbine (205), a turboshaft (206) and a ninth bracket (70). The gas storage cylinder, the eighth motor, the axial flow compressor, the combustion chamber, the first safety device, the second safety device, the first lever braking device, an electric ignition device, the third drive device and a nozzle are arranged on the ninth bracket; the eighth motor is connected with the axial flow compressor, and the axial flow compressor is driven by the eighth motor.

1 Claim, 11 Drawing Sheets

(56) References Cited

U.S. PATENT DOCUMENTS

2017/0363075 A1* 12/2017 Chen ................. F04B 41/02
2017/0369179 A1* 12/2017 Bradbrook ............ B64D 27/12
2018/0009304 A1* 1/2018 Chen ................. B60K 3/04

FOREIGN PATENT DOCUMENTS

| CN | 204553175 U | 8/2015 |
| CN | 205503269 U | 8/2016 |
| CN | 205618248 U | 10/2016 |
| WO | 2013006083 A1 | 1/2013 |
| WO | 2014198864 A1 | 12/2014 |

* cited by examiner

TURBOCHARGED NATURAL-GAS ENGINE

TECHNICAL FIELD

The present invention relates to an engine manufacturing technology.

BACKGROUND

An engine is a machine capable of converting the energy of other forms into mechanical energy, including an internal combustion engine (such as a gasoline engine and the like), an external combustion engine (such as a sterling engine, a steam engine and the like), a motor and the like. For example, the internal combustion engine is generally used for converting chemical energy into the mechanical energy. The engine is suitable for a power generation device and can also refer to a whole machine of a power device (such as a gasoline engine and an aeroengine).

SUMMARY

The content of the present invention is as follows:

A turbocharged natural-gas engine is characterized by comprising a first drive system, a second drive system, a third drive system and a fourth drive system.

The first drive system comprises a natural-gas storage cylinder, an eighth motor, an axial flow compressor, a combustion chamber, a first safety device, a second safety device, a first lever braking device, an electric ignition device, a third drive device, a nozzle, a turbine, a turboshaft and a ninth bracket which are in a superhigh-pressure gas production sealing device; the natural-gas storage cylinder, the eighth motor, the axial flow compressor, the combustion chamber, the first safety device, the second safety device, the first lever braking device, the electric ignition device, the third drive device and the nozzle are arranged on the ninth bracket; the eighth motor is connected with the axial flow compressor, and the axial flow compressor is driven by the eighth motor; and the turbine and the turboshaft are arranged in the nozzle and are fixedly connected with each other.

The superhigh-pressure gas production sealing device comprises a rack, a gas compressor which is arranged at the upper part of the rack, and a natural-gas storage cylinder which is arranged at the lower part of the rack; the gas compressor comprises an inner frame and a shell; the inner frame comprises an upper pressure plate, a double-layer cylinder plate and bearing plates; the interior of the upper pressure plate is hollow; a water inlet is formed in the upper part of the upper pressure plate; the double-layer cylinder plate comprises a first-layer cylinder plate and a second-layer cylinder plate; the first-layer cylinder plate is cylindrical and has an aperture smaller than the width of the upper pressure plate; the second-layer cylinder plate is also cylindrical and has an aperture smaller than the aperture of the first-layer cylinder plate; the first-layer cylinder plate is sleeved outside the second-layer cylinder plate; the top of the first-layer cylinder plate of the double-layer cylinder plate is fixedly connected with the bottom of the upper pressure plate; the top of the second-layer cylinder plate is also fixedly connected with the bottom of the upper pressure plate; the first-layer cylinder plate and the second-layer cylinder plate are both hollow inside; a first gas inlet is formed in the upper part of the shell; a portion of the bottom of the shell protrudes downward to form a double-layer cylinder plate groove corresponding to the double-layer cylinder plate; the double-layer cylinder plate groove comprises a first-layer cylindrical plate groove and a second-layer cylindrical plate groove; the first-layer cylinder plate can move up and down in the first-layer cylindrical plate groove; the second-layer cylinder plate can move up and down in the second-layer cylindrical plate groove; a bearing plate is arranged in the first-layer cylindrical plate groove; the shape of the bearing plate in the first-layer cylindrical plate groove is in a ring shape; the top of the bearing plate in the first-layer cylindrical plate groove is fixedly connected with the bottom of the first-layer cylinder plate; the bearing plate in the first-layer cylindrical plate groove is hollow inside; a side surface of the bearing plate in the first-layer cylindrical plate groove is in close contact with an inner wall of the first-layer cylindrical plate groove; a bearing plate is also arranged in the second-layer cylindrical plate groove; the shape of the bearing plate in the second-layer cylindrical plate groove is a ring shape; the top of the bearing plate in the second-layer cylindrical plate groove is fixedly connected with the bottom of the second-layer cylinder plate; the bearing plate in the second-layer cylindrical plate groove is hollow inside; a side surface of the bearing plate in the second-layer cylindrical plate groove is in close contact with an inner wall of the second-layer cylindrical plate groove; a first gas outlet is also formed in the bottom of the shell; the inner frame is arranged in the shell; the side surface of the upper pressure plate is attached to the inner wall of the upper part of the shell; the first-layer cylinder plate, a portion of the upper pressure plate, a portion of the bearing plate in the first-layer cylindrical plate groove and a portion of the shell form a first auxiliary gas chamber in an enclosing manner; a portion of the bottom of the shell, the first-layer cylinder plate, the second-layer cylinder plate, a portion of the bearing plate in the first-layer cylindrical plate groove, a portion of the bearing plate in the second-layer cylindrical plate groove and a portion of the upper pressure plate form a second auxiliary gas chamber in the enclosing manner; and the second-layer cylinder plate, a portion of the bottom of the shell, a portion of the bearing plate in the second-layer cylindrical plate groove and a portion of the upper pressure plate form a main gas chamber in the enclosing manner.

The natural-gas storage cylinder comprises a cylinder body; a second gas inlet which is communicated with the first gas outlet is formed in the top of the cylinder body, is internally provided with first threads and is provided with a threaded cover; the interior of the threaded cover is hollowed out to form a gas outlet pipe; a second gas outlet which is communicated with the gas outlet pipe is formed in the left part of the threaded cover; a third gear is arranged on the outer wall of the upper part of the threaded cover; the third gear is fixed to the outer wall of the upper part of the threaded cover; threads which are matched with the first threads in the second gas inlet are arranged on the outer wall of the lower part of the threaded cover; a second gas inlet cover is arranged below the threaded cover; the longitudinal section of the second gas inlet cover is in a U shape, and the second gas inlet cover is hollow inside; a first groove is formed in the upper part of a portion of the cylinder body at the periphery of the second gas inlet; the bottom end of the first gas outlet is arranged in the first groove; a second groove is formed in the upper part of a portion of the cylinder body near the first groove and is internally provided with second threads; and the cylinder body is hollow inside.

A first bracket is arranged at the upper part of the rack; second brackets are arranged on the left side and the right side of the middle part of the rack respectively; the first bracket is provided with a first drive device which is used for driving the upper pressure plate to move up and down; and each second bracket is provided with a second drive device which is used for driving the whole gas compressor to move up and down.

The first lever braking device comprises a third motor, a first bevel gear, a first vertical rod, a first lever, a second vertical rod, a second bevel gear and a third bracket; a third rack is arranged on the first vertical rod; the third rack is fixed to the first vertical rod; a fourth rack is arranged on the second vertical rod; the fourth rack is fixed to the second vertical rod; the top of the first vertical rod is fixedly connected with the bottom end of the right part of the first lever; the top of the second vertical rod is fixedly connected with the bottom end of the left part of the first lever; a fourth bracket, a fifth bracket and a sixth bracket are arranged at the periphery of the third bracket and are fixed to the third bracket; the third motor is arranged on the third bracket; the first bevel gear is arranged on the fourth bracket; the first lever is arranged on the fifth bracket; the second bevel gear is arranged on the sixth bracket; the third motor is provided with a fourth gear; the first bevel gear is engaged with the fourth gear on the third motor and the third rack on the first vertical rod; and the second bevel gear is engaged with the fourth rack on the second vertical rod and the third gear on the threaded cover.

A seventh bracket is arranged at the upper right part of the rack; the first drive device comprises a first motor which is arranged on the first bracket, a first gear which is arranged on the first bracket, a vertically arranged first dowel bar with a bottom end fixed to the upper pressure plate, a first rack arranged on the first dowel bar, and a second lever braking device; the second lever braking device comprises a third vertical rod, a second lever, a fourth vertical rod, a fifth rack and a sixth rack; the second lever is arranged on the seventh bracket; the fifth rack is fixed to the third vertical rod; the sixth rack is fixed to the fourth vertical rod; the top of the third vertical rod is fixedly connected with the bottom end of the left part of the second lever; the top of the fourth vertical rod is fixedly connected with the bottom end of the right part of the second lever; the first gear is engaged with the first rack and the fifth rack; the first motor is provided with the fifth gear; and the fifth gear is engaged with the sixth rack.

Each second drive device comprises a second motor which is arranged on the corresponding second bracket, a second gear which is arranged on the corresponding second bracket and is driven by the second motor, a second dowel bar which is fixed to the outer wall of the shell and is in an "L" shape, and a second rack which is arranged on the second dowel bar; each second gear is engaged with the corresponding second rack; each second motor can drive the corresponding second gear to rotate; each second drive device has the effects of pushing the whole gas compressor upward after the gas compressor compresses gas so as to enable the bottom end of the first gas outlet of the gas compressor to be separated from the first groove; and one second drive device is arranged on each of the second brackets on the left side and the right side of the middle part of the rack.

A second gas inlet cover support which is used for supporting the second gas inlet cover is arranged near the second gas inlet cover; the top of the second gas inlet cover support is fixedly connected with the bottom of a portion of the cylinder body at the periphery of the second gas inlet; the second gas inlet cover support is hollow inside; the second gas inlet cover is arranged in the second gas inlet cover support; a cover groove which is matched with a portion of the upper part of the second gas inlet cover is formed in the lower part of a portion of the cylinder body at the periphery of the second gas inlet, and a portion of the upper part of the second gas inlet cover can move up and down in the cover groove; a third gas inlet which is communicated with the interior of the cylinder body is formed in the right part of the second gas inlet cover support; and a gas passage which is communicated with the interior of the cylinder body is formed in the bottom of the second gas inlet cover support.

An eighth gas inlet is formed in the left part of the combustion chamber; a ninth gas inlet is formed in the right part of the combustion chamber and is located on the lower right side of the eighth gas inlet; a gas outlet of the axial flow compressor is communicated with the eighth gas inlet; a gas outlet pipe in the natural-gas storage cylinder is communicated with the ninth gas inlet; a first micro hole is formed in the upper part of the combustion chamber; the electric ignition device is arranged on the left side of the combustion chamber; the upper end of the nozzle is communicated with the interior of the combustion chamber; a small hole is formed in the right part of the nozzle and is provided with a control box; a regulation ingot is arranged in the control box; the left part of the control box is communicated with the nozzle; and a second micro hole is formed in the right part of the control box.

The third drive device comprises an insulating plate, a third dowel bar, a seventh motor, a seventh gear and a seventh rack; the seventh gear is engaged with the seventh rack; the seventh motor is provided with an eighth gear; the eighth gear is engaged with the seventh gear; the seventh rack is arranged on the third dowel bar; the third dowel bar extends into the combustion chamber through the first micro hole; and the top of the insulating plate is fixedly connected with the bottom of the third dowel bar.

The second safety device comprises a tenth motor, an eleventh gear, an eleventh rack and a second bumper; the tenth motor is provided with a twelfth gear; the twelfth gear is engaged with the eleventh gear; the eleventh gear is engaged with the eleventh rack; the eleventh rack is arranged on the second bumper; the second bumper extends into the control box through the second micro hole; and the left part of the second bumper is fixedly connected with the right part of the regulation ingot.

The first safety device comprises a ninth motor, a ninth gear, an eighth rack and a first bumper; the ninth motor is provided with a tenth gear; the tenth gear is engaged with the ninth gear; the ninth gear is engaged with the eighth rack; and the eighth rack is arranged on the first bumper.

The structure of the second drive system is exactly identical with the structure of the first drive system; the structure of the third drive system is exactly identical with the structure of the first drive system; and the structure of the fourth drive system is also exactly identical with the structure of the first drive system.

The turboshaft in the first drive system is fixedly connected with a rotor on the axial flow compressor in the second drive system; the turboshaft in the second drive system is fixedly connected with a rotor on the axial flow compressor in the third drive system; the turboshaft in the third drive system is fixedly connected with a rotor on the axial flow compressor in the fourth drive system; and the turboshaft in the fourth drive system is fixedly connected with a rotor on the axial flow compressor in the first drive system.

DETAILED DESCRIPTION

Specific embodiments of the present invention will be further described in detail in combination with drawings.

A turbocharged natural-gas engine, as shown in FIG. 1 to FIG. 16, comprises a first drive system 201, a second drive system 202, a third drive system 203 and a fourth drive system 204.

Figure 15:
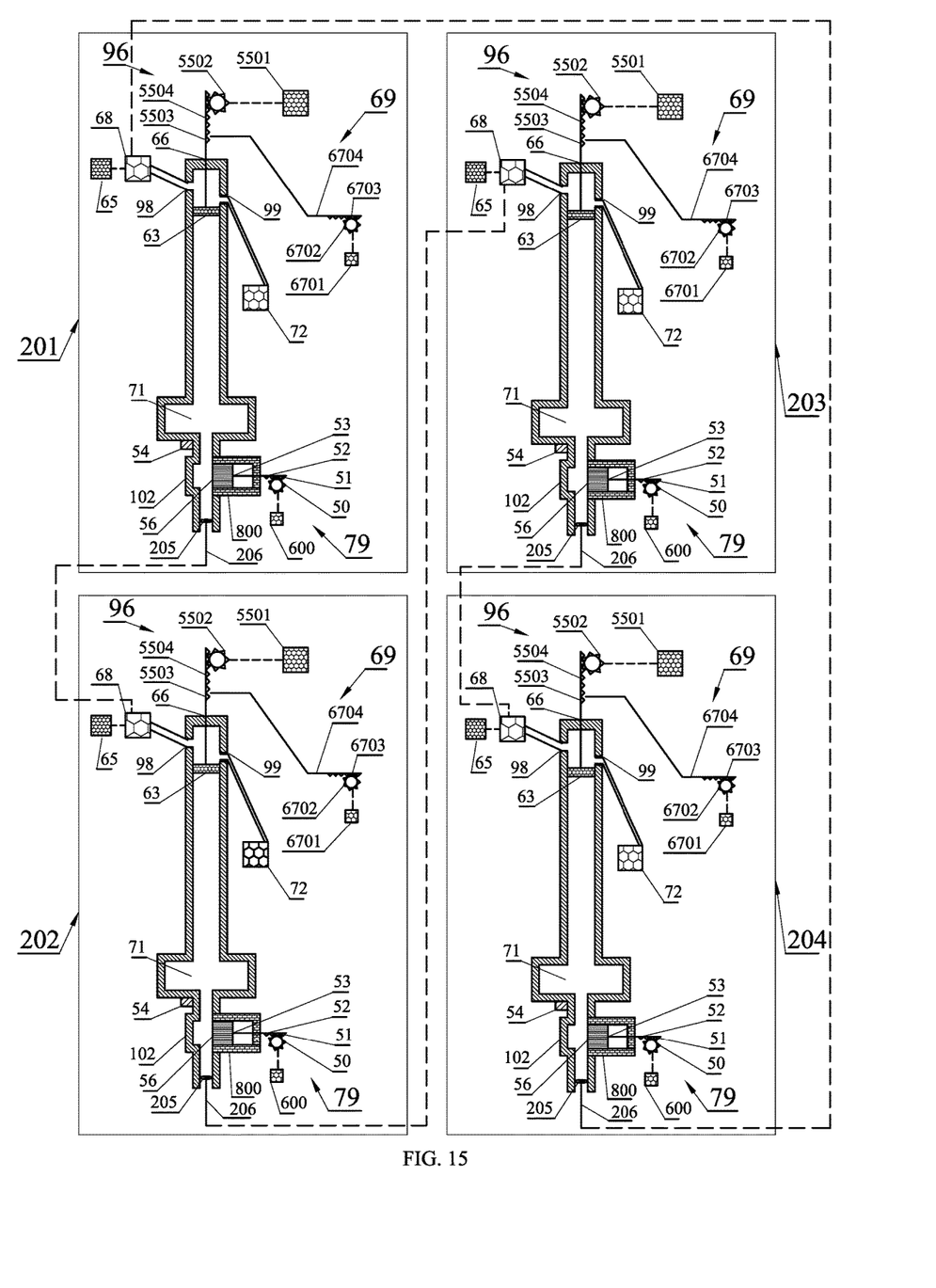
FIG. 15 is a structural schematic diagram of a first drive system, a second drive system, a third drive system and a fourth drive system.
Figure 16:
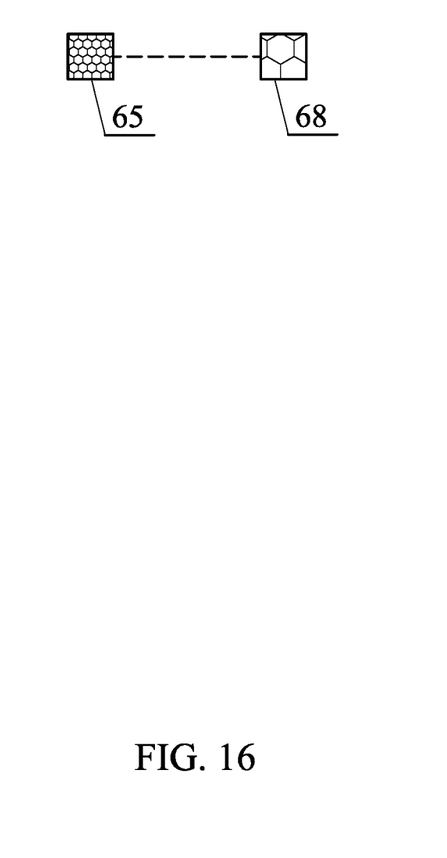
FIG. 16 is a structural schematic diagram of an axial flow compressor and an eighth motor.

The first drive system 201 comprises a natural-gas storage cylinder 72, an eighth motor 65, an axial flow compressor 68, a combustion chamber 71, a first safety device 69, a second safety device 79, a first lever braking device 73, an electric ignition device 54, a third drive device 96, a nozzle 102, a turbine 205, a turboshaft 206 and a ninth bracket 70 which are in a superhigh-pressure gas production sealing device 77; the natural-gas storage cylinder 72, the eighth motor 65, the axial flow compressor 68, the combustion chamber 71, the first safety device 69, the second safety device 79, the first lever braking device 73, the electric ignition device 54, the third drive device 96 and the nozzle 102 are arranged on the ninth bracket 70; the eighth motor 65 is connected with the axial flow compressor 68, and the axial flow compressor 68 is driven by the eighth motor 65; and the turbine 205 and the turboshaft 206 are arranged in the nozzle 102 and are fixedly connected with each other.

Figure 5:
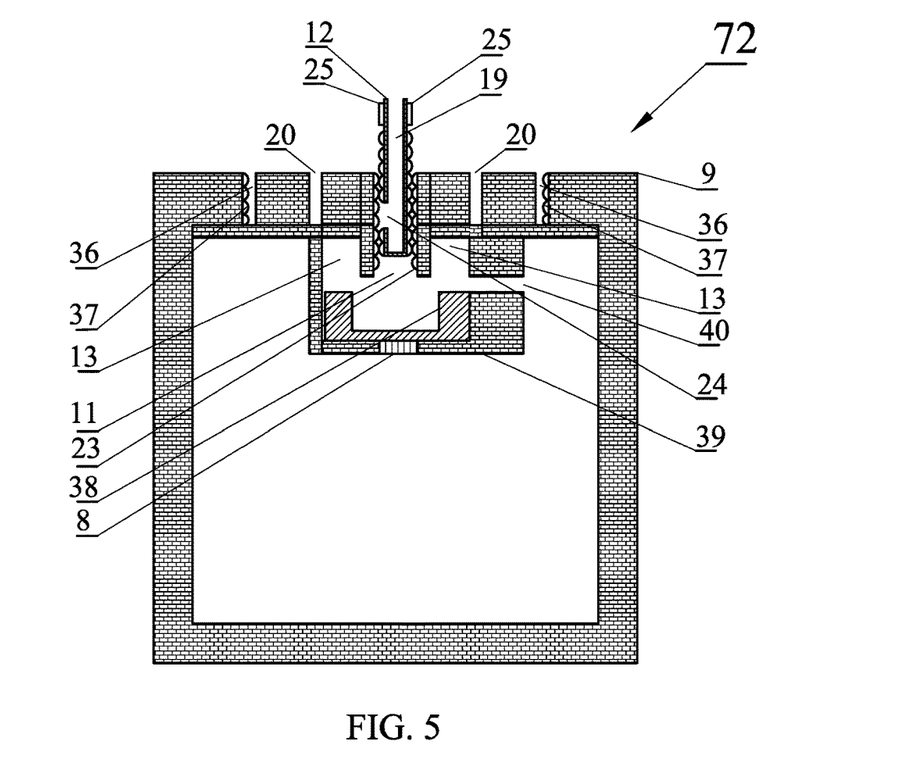
FIG. 5 is a structural schematic diagram of a natural-gas storage cylinder in FIG. 1.
Figure 6:
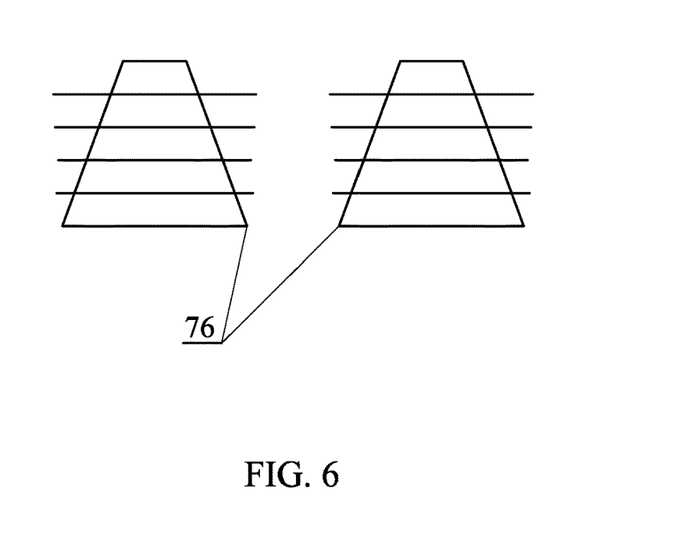
FIG. 6 is a structural schematic diagram of a rack.

The superhigh-pressure gas production sealing device 77 comprises a rack 76 (not shown in the figure), a gas compressor 74 which is arranged at the upper part of the rack 76, and a natural-gas storage cylinder 72 (as shown in FIGS. 5 and 6) which is arranged at the lower part of the rack 76; the gas compressor 74 comprises an inner frame 78 and a shell 1; the inner frame 78 comprises an upper pressure plate 2, a double-layer cylinder plate 81 and bearing plates 58; the interior of the upper pressure plate 2 is hollow; a water inlet 57 is formed in the upper part of the upper pressure plate 2; the double-layer cylinder plate 81 comprises a first-layer cylinder plate 3 and a second-layer cylinder plate 29; the first-layer cylinder plate 3 has a cylindrical shape and has an aperture smaller than the width of the upper pressure plate 2; the second-layer cylinder plate 29 also has a cylindrical shape and has an aperture smaller than the aperture of the first-layer cylinder plate 3; the first-layer cylinder plate 3 is sleeved outside the second-layer cylinder plate 29; the top of the first-layer cylinder plate 3 of the double-layer cylinder plate 81 is fixedly connected with the bottom of the upper pressure plate 2; the top of the second-layer cylinder plate 29 of the double-layer cylinder plate 81 is also fixedly connected with the bottom of the upper pressure plate 2; the first-layer cylinder plate 3 and the second-layer cylinder plate 29 are both hollow inside; a first gas inlet 7 is formed in the upper part of the shell 1; a portion of the bottom of the shell 1 protrudes downward to form a double-layer cylinder plate groove 80 corresponding to the double-layer cylinder plate; the double-layer cylinder plate groove 80 comprises a first-layer cylindrical plate groove 4 and a second-layer cylindrical plate groove 30; the first-layer cylinder plate 3 can move up and down in the first-layer cylindrical plate groove 4; the second-layer cylinder plate 29 can move up and down in the second-layer cylindrical plate groove 30; one bearing plate 58 is arranged in the first-layer cylindrical plate groove 4 and is in a ring shape; the top of the bearing plate 58 in the first-layer cylindrical plate groove 4 is fixedly connected with the bottom of the first-layer cylinder plate 3; the bearing plate 58 in the first-layer cylindrical plate groove 4 is hollow inside; the side surface of the bearing plate 58 in the first-layer cylindrical plate groove 4 is in close contact with the inner wall of the first-layer cylindrical plate groove 4; one bearing plate 58 is also arranged in the second-layer cylindrical plate groove 30 and is in the ring shape; the top of the bearing plate 58 in the second-layer cylindrical plate groove 30 is fixedly connected with the bottom of the second-layer cylinder plate 29; the bearing plate 58 in the second-layer cylindrical plate groove 30 is hollow inside; the side surface of the bearing plate 58 in the second-layer cylindrical plate groove 30 is in close contact with the inner wall of the second-layer cylindrical plate groove 30; a first gas outlet 5 is also formed in the bottom of the shell 1; the inner frame 78 is arranged in the shell 1; the side surface of the upper pressure plate 2 is attached to the inner wall of the upper part of the shell 1; the first-layer cylinder plate 3, a portion of the upper pressure plate 2, a portion of the bearing plate 58 in the first-layer cylindrical plate groove 4 and a portion of the shell 1 form a first auxiliary gas chamber 10 in an enclosing manner; a portion of the bottom of the shell 1, the first-layer cylinder plate 3, the second-layer cylinder plate 29, a portion of the bearing plate 58 in the first-layer cylindrical plate groove 4, a portion of the bearing plate 58 in the second-layer cylindrical plate groove 30, and a portion of the upper pressure plate 2 form a second auxiliary gas chamber 28 in the enclosing manner; and the second-layer cylinder plate 29, a portion of the bottom of the shell 1, a portion of the bearing plate 58 in the second-layer cylindrical plate groove 30 and a portion of the upper pressure plate 2 form a main gas chamber 6 in the enclosing manner.

The natural-gas storage cylinder 72 comprises a cylinder body 9 (as shown in FIG. 5); a second gas inlet 11 which is communicated with the first gas outlet 5 is formed in the top of the cylinder body 9, is internally provided with first threads 23 and is provided with a threaded cover 12; the interior of the threaded cover 12 is hollowed out to form a gas outlet pipe 19; a second gas outlet 24 which is communicated with the gas outlet pipe 19 is formed in the left part of the threaded cover 12; a third gear 25 is arranged on the outer wall of the upper part of the threaded cover 12; the third gear 25 is fixed to the outer wall of the upper part of the threaded cover 12; threads which are matched with the first threads 23 in the second gas inlet 11 are arranged on the outer wall of the lower part of the threaded cover 12; a second gas inlet cover 38 is arranged below the threaded cover 12; the longitudinal section of the second gas inlet cover 38 is in a "U shape", and the second gas inlet cover 38 is hollow inside; a first groove 20 is formed in the upper part of a portion of the cylinder body 9 at the periphery of the second gas inlet 11; the bottom end of the first gas outlet 5 is arranged in the first groove 20; a second groove 36 is formed in the upper part of a portion of the cylinder body 9 near the first groove 20 and is internally provided with second threads 37; and the cylinder body 9 is hollow inside.

A first bracket (belonging to the prior art and not shown in the figure, the same as below) is arranged at the upper part of the rack 76; second brackets are arranged on the left side and the right side of the middle part of the rack 76 respectively; the first bracket is provided with a first drive device 84 which is used for driving the upper pressure plate 2 to move up and down; and each second bracket is provided with a second drive device which is used for driving the whole gas compressor to move up and down.

Figure 9:
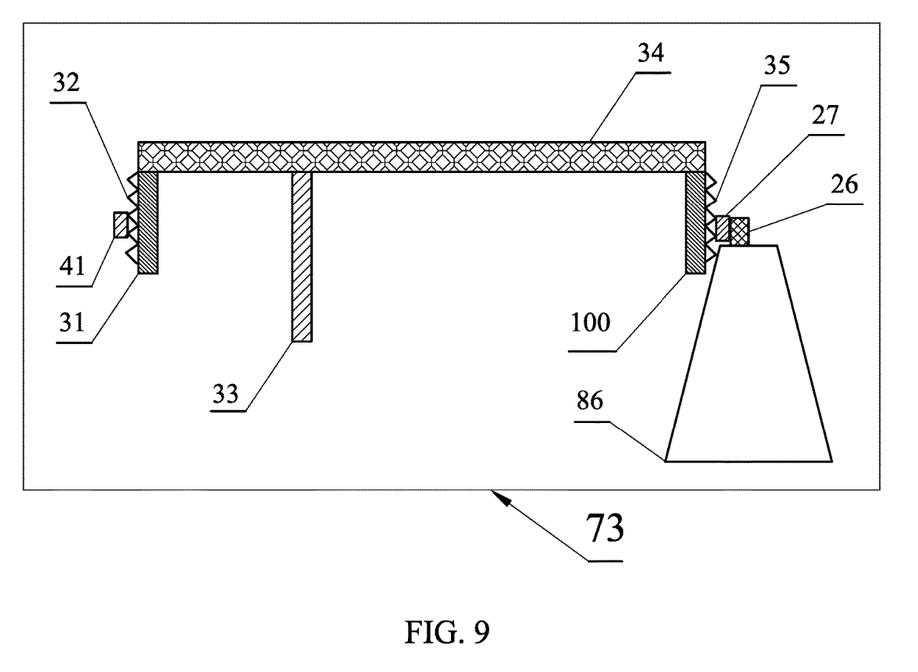
FIG. 9 is a structural schematic diagram of a first lever braking device.

The first lever braking device 73 comprises a third motor 26, a first bevel gear 27, a first vertical rod 100, a first lever 34, a second vertical rod 31, a second bevel gear 41 and a third bracket 86 (as shown in FIG. 9); a third rack 35 is arranged on the first vertical rod 100; the third rack 35 is fixed to the first vertical rod 100; a fourth rack 32 is arranged on the second vertical rod 31; the fourth rack 32 is fixed to the second vertical rod 31; the top of the first vertical rod 100 is fixedly connected with the bottom end of the right part of the first lever 34; the top of the second vertical rod 31 is fixedly connected with the bottom end of the left part of the first lever 34; a fourth bracket, a fifth bracket 33 and a sixth bracket are arranged at the periphery of the third bracket 86 and are fixed to the third bracket 86; the third motor 26 is arranged on the third bracket 86; the first bevel gear 27 is arranged on the fourth bracket; the first lever 34 is arranged on the fifth bracket 33; the second bevel gear 41 is arranged on the sixth bracket; the third motor 26 is provided with a fourth gear; the first bevel gear 27 is engaged with the fourth gear on the third motor 26 and the third rack 35 on the first vertical rod 100; and the second bevel gear 41 is engaged with the fourth rack 32 on the second vertical rod 31 and the third gear 25 on the threaded cover 12.

Figure 10:
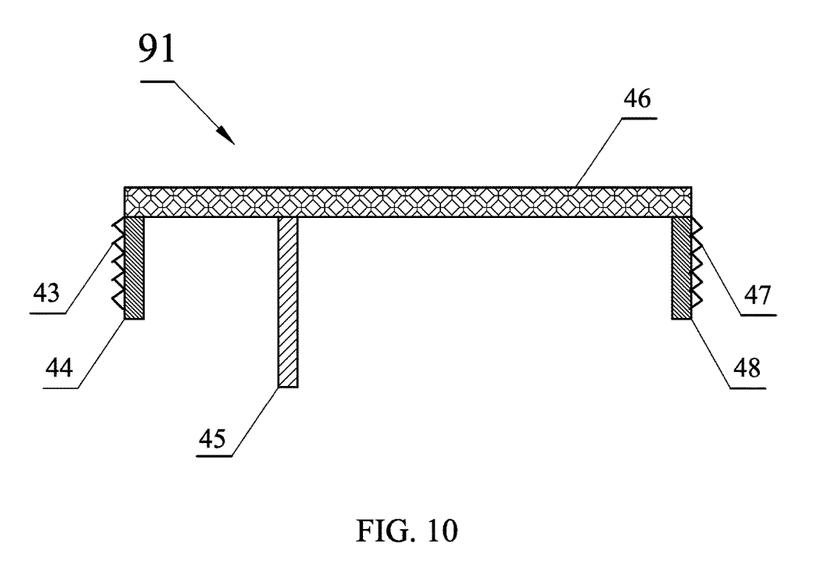
FIG. 10 is a structural schematic diagram of a second lever braking device.

A seventh bracket 45 is arranged at the upper right part of the rack 76; the first drive device 84 comprises a first motor 2101 which is arranged on the first bracket, a first gear 2102 which is arranged on the first bracket, a vertically arranged first dowel bar 2103 with a bottom end fixed to the upper pressure plate 2, a first rack 2104 arranged on the first dowel bar 2103, and a second lever braking device 91 (as shown in FIG. 10); the second lever braking device 91 comprises a third vertical rod 44, a second lever 46, a fourth vertical rod 48, a fifth rack 43 and a sixth rack 47; the second lever 46 is arranged on the seventh bracket 45; the fifth rack 43 is fixed to the third vertical rod 44; the sixth rack 47 is fixed to the fourth vertical rod 48; the top of the third vertical rod 44 is fixedly connected with the bottom end of the left part of the second lever 46; the top of the fourth vertical rod 48 is fixedly connected with the bottom end of the right part of the second lever 46; the first gear 2102 is engaged with the first rack 2104 and the fifth rack 43; the first motor 2101 is provided with the fifth gear; and the fifth gear is engaged with the sixth rack 47.

Each second drive device comprises a second motor 2201 which is arranged on the corresponding second bracket, a second gear 2202 which is arranged on the corresponding second bracket and is driven by the second motor 2201, a second dowel bar 2203 which is fixed to the outer wall of the shell 1 and is in an "L" shape, and a second rack 2204 which is arranged on the second dowel bar 2203; each second gear 2202 is engaged with the corresponding second rack 2204; each second motor 2201 can drive the corresponding second gear 2202 to rotate; each second drive device has the effects of pushing the whole gas compressor upward after the gas compressor compresses gas to enable the bottom end of the first gas outlet 5 of the gas compressor to be separated from the first groove 20; and one second drive device is arranged on each of the second brackets on the left side and the right side of the middle part of the rack 76.

Figure 1:
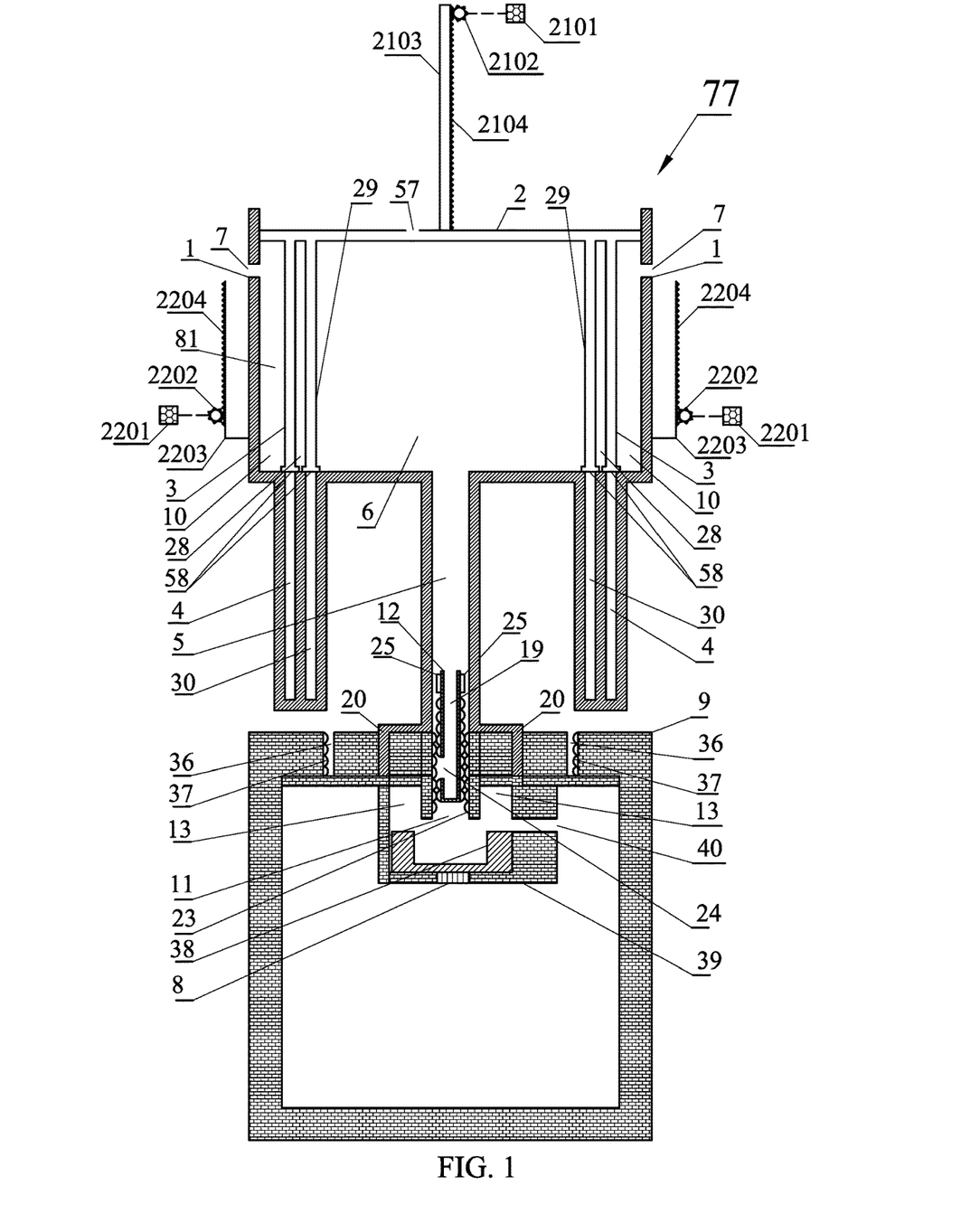
FIG. 1 is a structural schematic diagram of a portion of a superhigh-pressure gas production sealing device.
Figure 2:
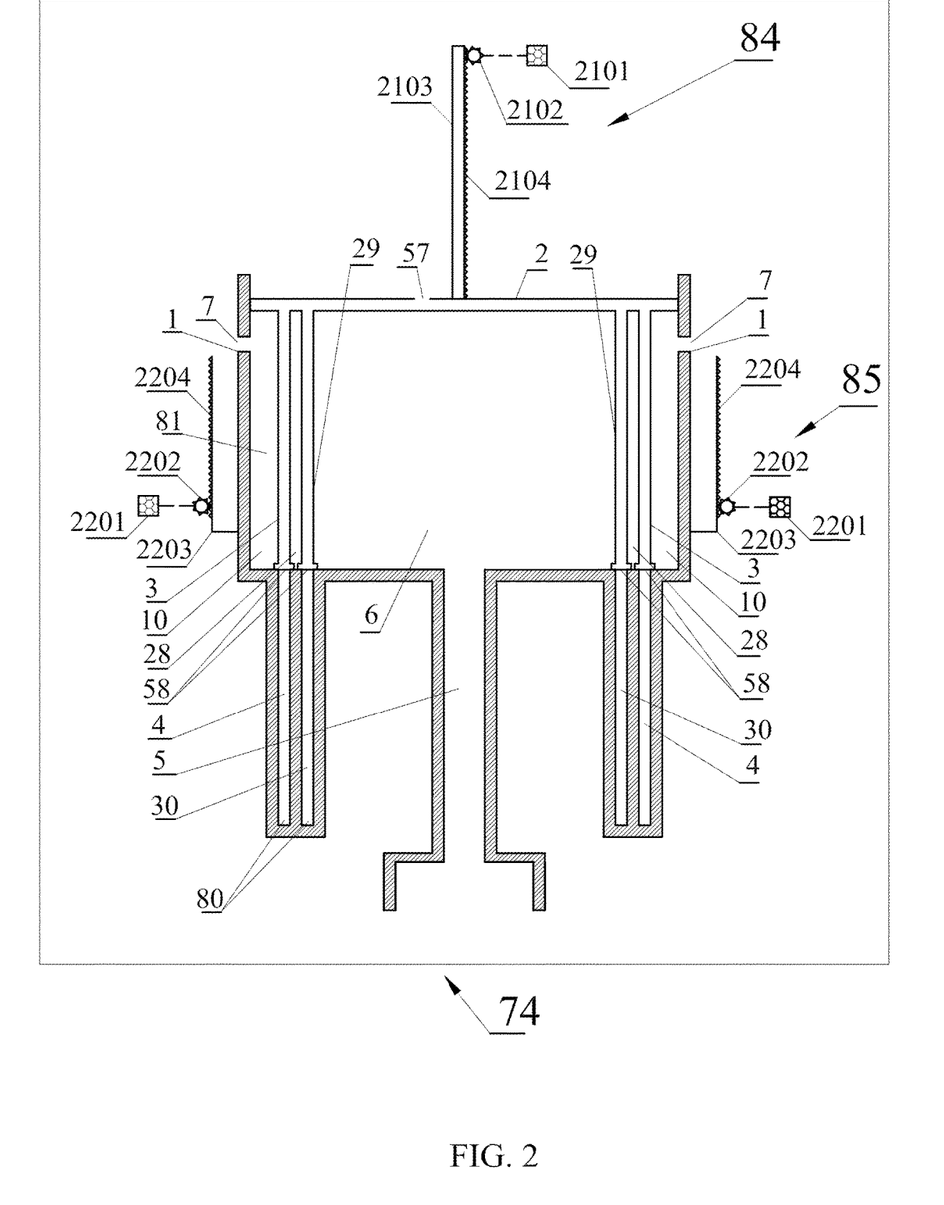
FIG. 2 is a structural schematic diagram of a gas compressor in FIG. 1.
Figure 3:
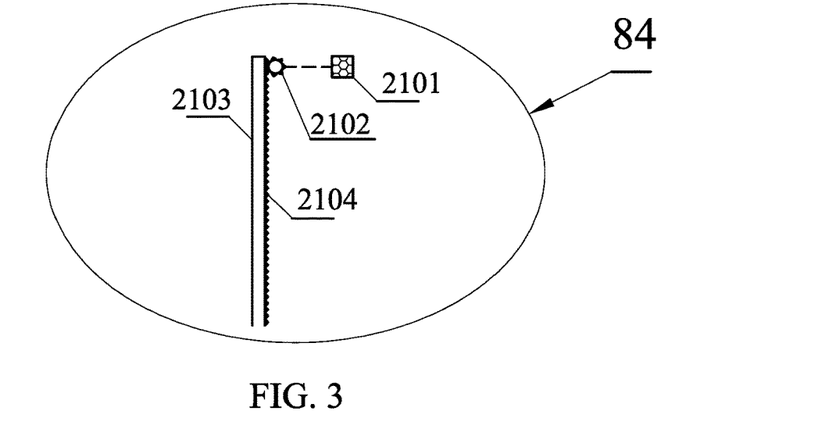
FIG. 3 is a structural schematic diagram of a first drive device in FIG. 1.
Figure 4:
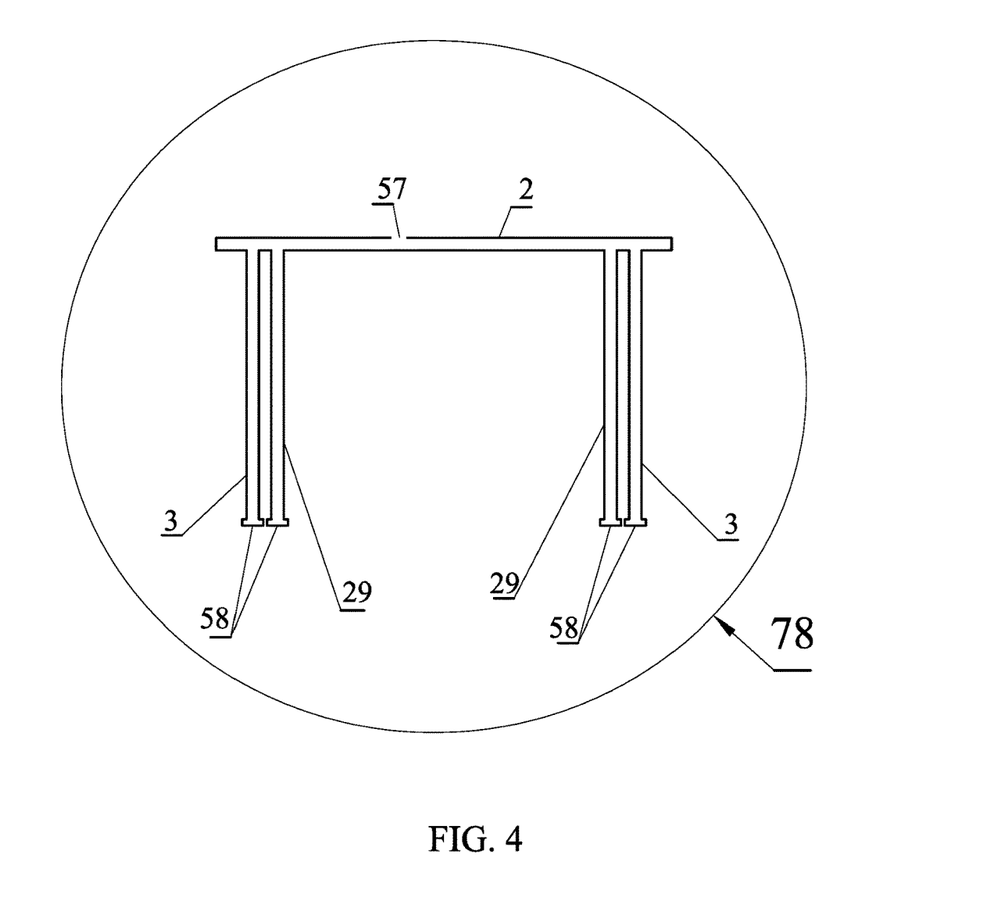
FIG. 4 is a structural schematic diagram of an inner frame in FIG. 1.
Figure 7:
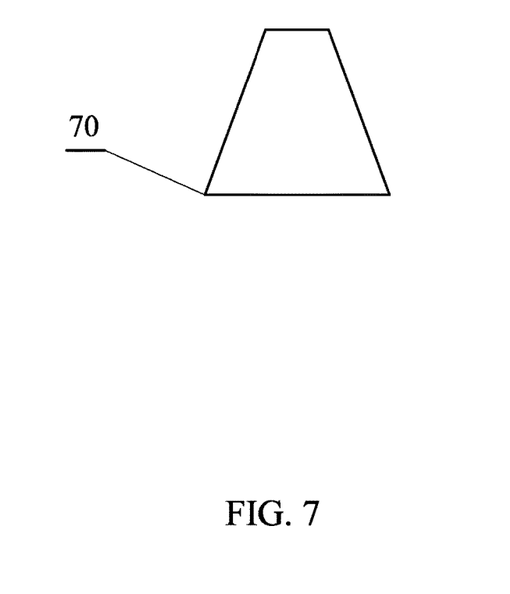
FIG. 7 is a structural schematic diagram of a ninth bracket.
Figure 8:
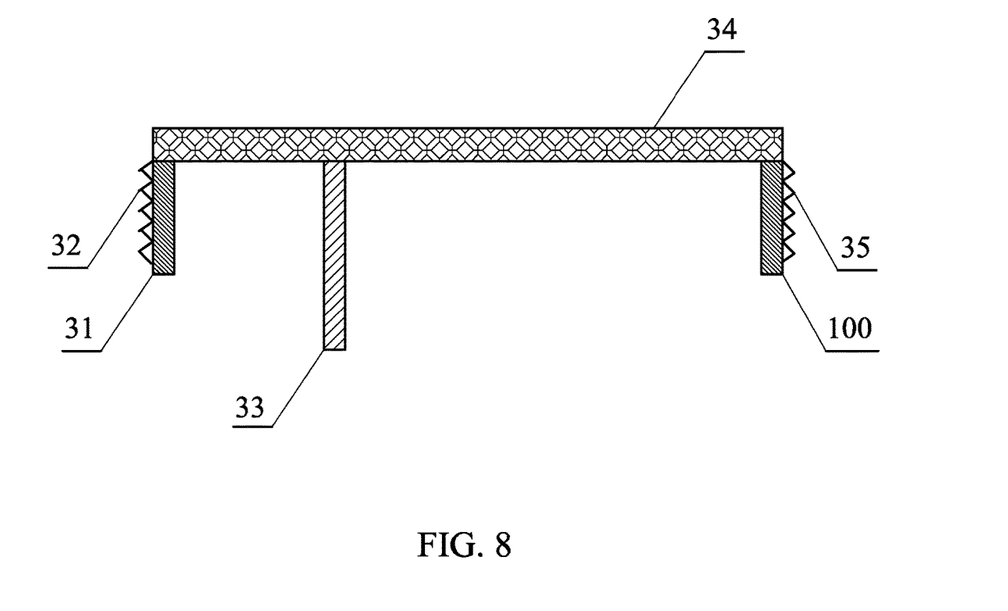
FIG. 8 is a structural schematic diagram of a portion of a first lever braking device.

The ninth bracket 70 in FIG. 7 can be referred to when the first bracket, the second bracket, the third bracket, the fourth bracket, the fifth bracket, the sixth bracket aforementioned are embodied; likewise, the first drive device 84 in FIG. 3 can be referred to when the second drive device is embodied.

A second gas inlet cover support 39 which is used for supporting the second gas inlet cover 38 is arranged near the second gas inlet cover 38; the top of the second gas inlet cover support 39 is fixedly connected with the bottom of a portion of the cylinder body 9 at the periphery of the second gas inlet 11; the second gas inlet cover support 39 is hollow inside; the second gas inlet cover 38 is arranged in the second gas inlet cover support 39; a cover groove 13 which is matched with a portion of the upper part of the second gas inlet cover 38 is formed in the lower part of a portion of the cylinder body 9 at the periphery of the second gas inlet 11, and a portion of the upper part of the second gas inlet cover 38 can move up and down in the cover groove 13; a third gas inlet 40 which is communicated with the interior of the cylinder body 9 is formed in the right part of the second gas inlet cover support 39; and a gas passage 8 which is communicated with the interior of the cylinder body 9 is formed in the bottom of the second gas inlet cover support 39.

Figure 11:
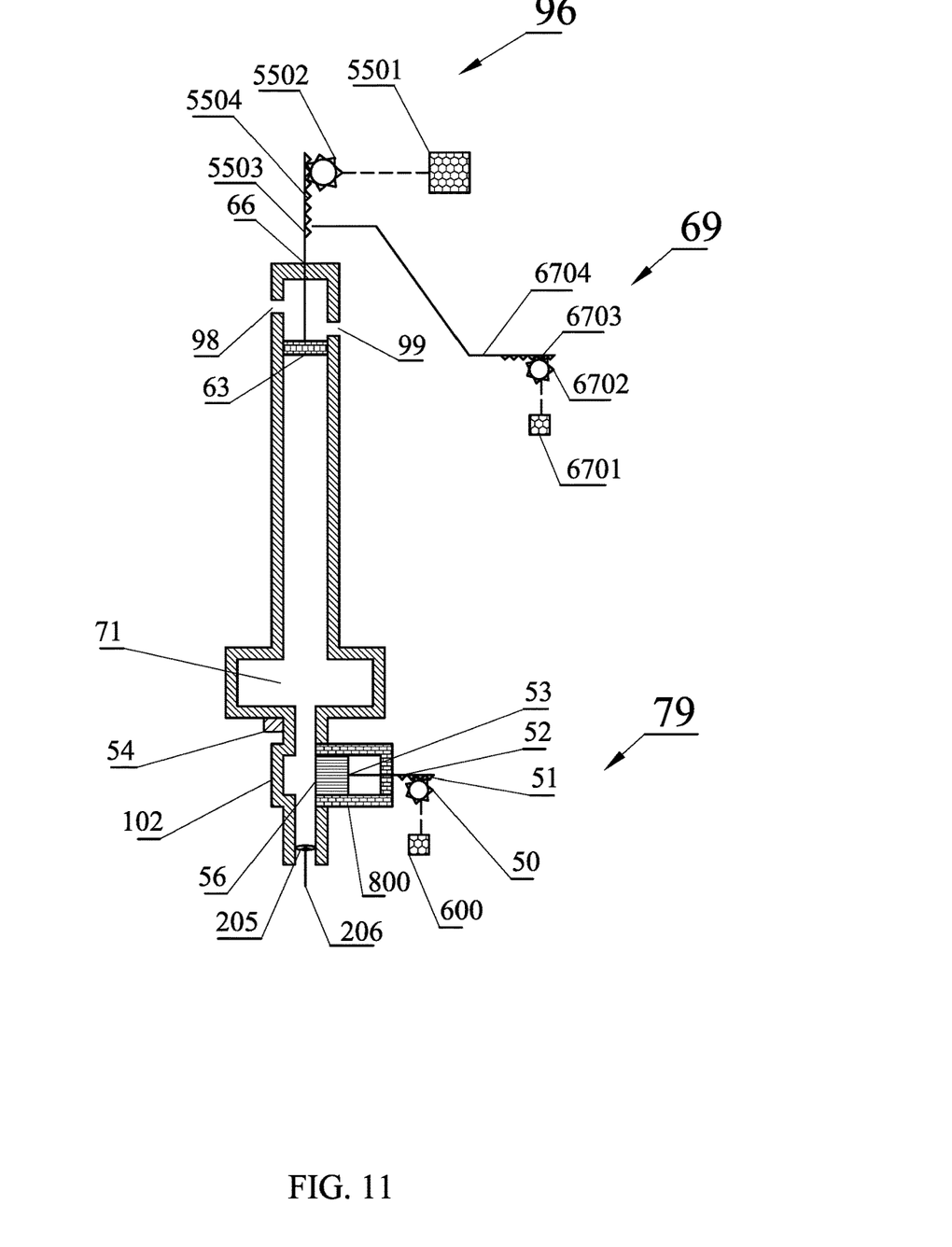
FIG. 11 is a structural schematic diagram of a combustion chamber.

An eighth gas inlet 98 (as shown in FIG. 11) is formed in the left part of the combustion chamber 71; a ninth gas inlet 99 is formed in the right part of the combustion chamber 71 and is located on the lower right side of the eighth gas inlet 98; a gas outlet of the axial flow compressor 68 is communicated with the eighth gas inlet 98; a gas outlet pipe 19 in the natural-gas storage cylinder 72 is communicated with the ninth gas inlet 99; a first micro hole 66 is formed in the upper part of the combustion chamber 71; the electric ignition device 54 is arranged on the left side of the combustion chamber 71; the upper end of the nozzle 102 is communicated with the interior of the combustion chamber 71; a small hole is formed in the right part of the nozzle 102 and is provided with a control box 800; a regulation ingot 56 is arranged in the control box 800; the left part of the control box 800 is communicated with the nozzle 102; and a second micro hole 53 is formed in the right part of the control box 800.

Figure 12:
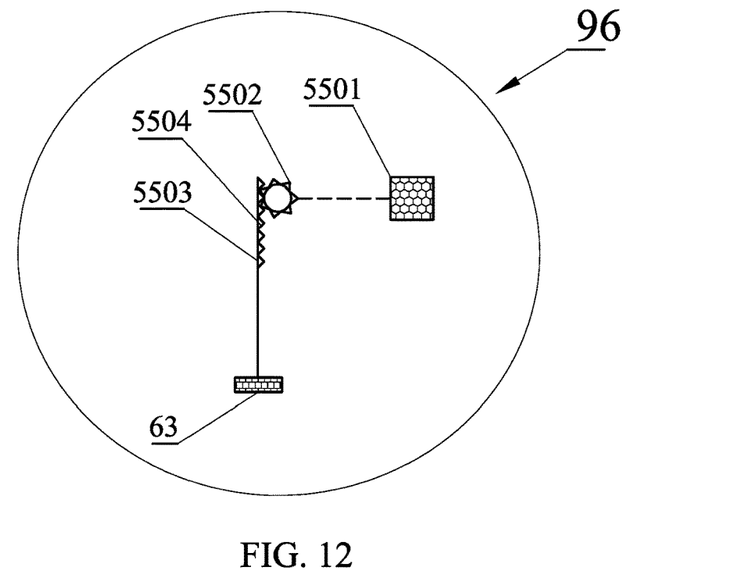
FIG. 12 is a structural schematic diagram of a third drive device in FIG. 11.

The third drive device 96 comprises an insulating plate 63, a third dowel bar 5503, a seventh motor 5501, a seventh gear 5502 and a seventh rack 5504; the seventh gear 5502 is engaged with the seventh rack 5504; the seventh motor 5501 is provided with an eighth gear; the eighth gear is engaged with the seventh gear 5502; the seventh rack 5504 is arranged on the third dowel bar 5503; the third dowel bar 5503 extends into the combustion chamber 71 through the first micro hole 66; and the top of the insulating plate 63 is fixedly connected with the bottom of the third dowel bar 5503.

Figure 14:
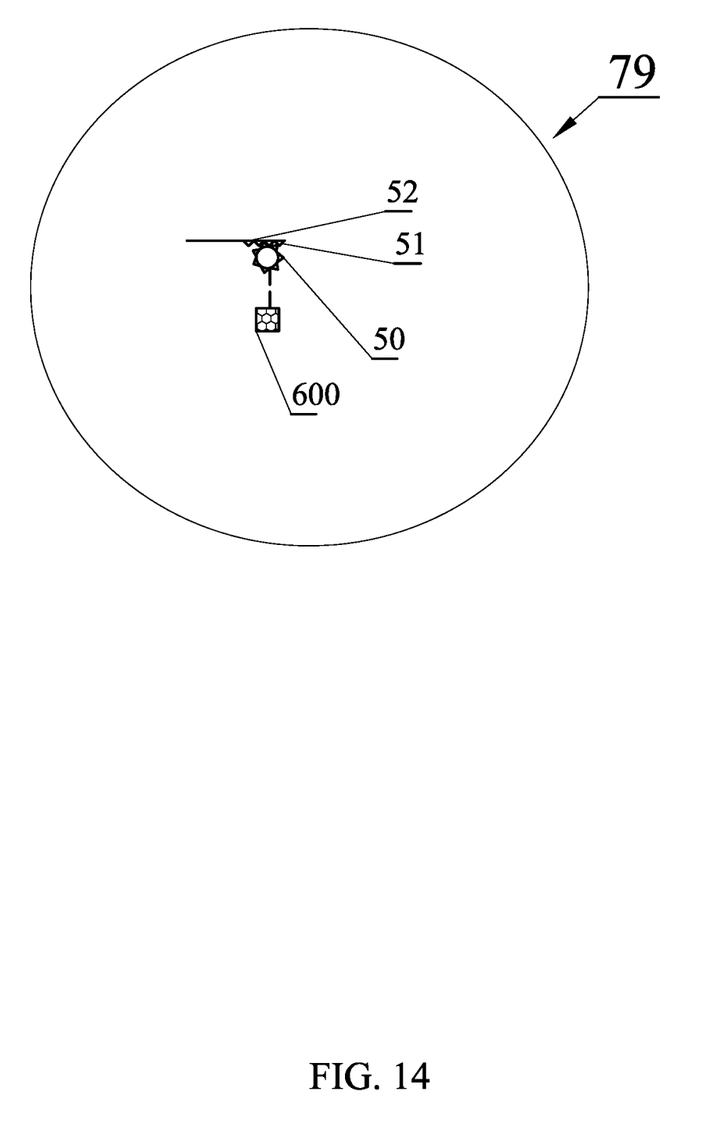
FIG. 14 is a structural schematic diagram of a second safety device in FIG. 11.

The second safety device 79 comprises a tenth motor 600, an eleventh gear 50, an eleventh rack 51 and a second bumper 52; the tenth motor 600 is provided with a twelfth gear; the twelfth gear is engaged with the eleventh gear 50; the eleventh gear 50 is engaged with the eleventh rack 51; the eleventh rack 51 is arranged on the second bumper 52; the second bumper 52 extends into the control box 800 through the second micro hole 53; and the left part of the second bumper 52 is fixedly connected with the right part of the regulation ingot 56.

Figure 13:
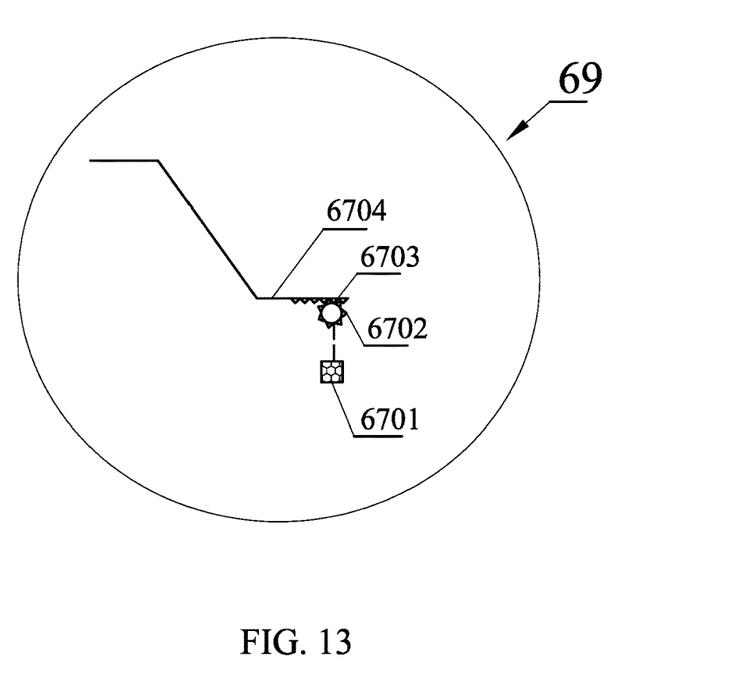
FIG. 13 is a structural schematic diagram of a first safety device in FIG. 11.

The first safety device 69 comprises a ninth motor 6701, a ninth gear 6702, an eighth rack 6703 and a first bumper 6704; the ninth motor 6701 is provided with a tenth gear; the tenth gear is engaged with the ninth gear 6702; the ninth gear 6702 is engaged with the eighth rack 6703; and the eighth rack 6703 is arranged on the first bumper 6704.

The structure of the second drive system 202 is exactly identical with the structure of the first drive system 201; the structure of the third drive system 203 is exactly identical with the structure of the first drive system 201; and the structure of the fourth drive system 204 is also exactly identical with the structure of the first drive system 201.

The turboshaft 206 in the first drive system 201 is fixedly connected with a rotor on the axial flow compressor 68 in the second drive system 202; the turboshaft 206 in the second drive system 202 is fixedly connected with a rotor on the axial flow compressor 68 in the third drive system 203; the turboshaft 206 in the third drive system 203 is fixedly connected with a rotor on the axial flow compressor 68 in the fourth drive system 204; and the turboshaft 206 in the fourth drive system 204 is fixedly connected with a rotor on the axial flow compressor 68 in the first drive system 201.

The concrete operation process of the present invention is as follows:

1. The threaded cover 12 is rotated downward to enable the second gas outlet 24 to communicate with the cylinder body 9.
2. Natural gas sequentially enters the first auxiliary gas chamber 10, the first-layer cylindrical plate groove 4, the second auxiliary gas chamber 28, the second-layer cylindrical plate groove 30 and the main gas chamber 6 from the first gas inlet 7.
3. After the first motor 2101 is started, the first dowel bar 2103 is driven to move downward, and the upper pressure plate 2 also moves downward along with the first dowel bar 2103 and compresses gas in the main gas chamber 6; in the compression process, the pressure intensity of the gas in the first auxiliary gas chamber 10, the pressure intensity of the gas in the first-layer cylindrical plate groove 4, the pressure intensity of the gas in the second auxiliary gas chamber 28, the pressure intensity of the gas in the second-layer cylindrical plate groove 30 and the pressure intensity of the gas in the main gas chamber 6 are progressively increased, so that leakage of the gas in the main gas chamber 6 can be reduced; and the compressed gas is ejected from the first gas outlet 5 and sequentially enters the second gas inlet 11, the third gas inlet 40 and the cylinder body 9.
4. After the second motor 2201 is started, the second dowel bar 2203 is driven to move upward and pushes the whole gas compressor 74 to move upward, so that the bottom end of the first gas outlet 5 is separated from the groove 20; and in the process, due to the pushing effect of the gas in the gas passage 8 to the second gas inlet cover 38, the second gas inlet cover 38 moves upward and enters the cover groove 13.
5. The threaded cover 12 is rotated upward to block the gas in the cylinder body 9 from overflowing from the second gas outlet 24.
6. The gas outlet pipe 19 in the natural-gas storage cylinder 72 is communicated with the ninth gas inlet 99.
7. The tenth motor 600 in the first drive system 201 is started to enable the second bumper 52 to move to the left, so that the nozzle 102 in the first drive system 210 is closed.
8. The eighth motor 65 in the first drive system 201 is started to enable the axial flow compressor 68 to run, and air enters the combustion chamber 71 from the axial flow compressor 68.
9. The seventh motor 5501 in the first drive system 201 is started to enable the insulating plate 63 to move downward.
10. The third motor 26 in the first drive system 201 is started to enable the gas outlet pipe 19 to move downward, and the natural gas in the natural-gas storage cylinder 72 overflows outward from the interior of the cylinder body 9 and enters the combustion chamber 71.
11. The seventh motor 5501 in the first drive system 201 is started to enable the insulating plate 63 to continuously move downward.
12. The electric ignition device 54 in the first drive system 201 ignites mixed gas in the combustion chamber 71.
13. The tenth motor 600 in the first drive system 201 is reversely started to enable the second bumper 52 to move to the right, so that the nozzle 102 in the first drive system 201 is opened, and the gas in the combustion chamber 71 is ejected from the nozzle 102 in the first drive system 201 and acts on the turbine 205 and the turboshaft 206 in the nozzle 102 in the first drive system 201.
14. The turboshaft 206 in the nozzle 102 in the first drive system 201 drives the rotor on the axial flow compressor 68 in the second drive system 202 to rotate together. External air enters the combustion chamber 71 in the second drive system 202 from the gas outlet of the axial flow compressor 68 in the second drive system 202.
15. The seventh motor 5501 in the second drive system 202 is started to enable the insulating plate 63 to move downward.
16. The third motor 26 in the second drive system 202 is started to enable the gas outlet pipe 19 to move downward, and the natural gas in the natural-gas storage cylinder 72 overflows outward from the interior of the cylinder body 9 and enters the combustion chamber 71.
17. The seventh motor 5501 in the second drive system 202 is started to enable the insulating plate 63 to continuously move downward.
18. The electric ignition device 54 in the second drive system 202 ignites mixed gas in the combustion chamber 71.
19. The tenth motor 600 in the second drive system 202 is reversely started to enable the second bumper 52 to move to the right, so that the nozzle 102 in the second drive system 202 is opened, and the gas in the combustion chamber 71 is ejected from the nozzle 102 in the second drive system 202 and acts on the turbine 205 and the turboshaft 206 in the nozzle 102 in the second drive system 202.
20. The turboshaft 206 in the nozzle 102 in the second drive system 202 drives the rotor on the axial flow compressor 68 in the third drive system 203 to rotate together. External air enters the combustion chamber 71 in the third drive system 203 from the gas outlet of the axial flow compressor 68 in the third drive system 203.

21. The seventh motor 5501 in the third drive system 203 is started to enable the insulating plate 63 to move downward.

22. The third motor 26 in the third drive system 203 is started to enable the gas outlet pipe 19 to move downward, and the natural gas in the natural-gas storage cylinder 72 overflows outward from the interior of the cylinder body 9 and enters the combustion chamber 71.

23. The seventh motor 5501 in the third drive system 203 is started to enable the insulating plate 63 to continuously move downward.

24. The electric ignition device 54 in the third drive system 203 ignites mixed gas in the combustion chamber 71.

25. The tenth motor 600 in the third drive system 203 is reversely started to enable the second bumper 52 to move to the right, so that the nozzle 102 in the third drive system 203 is opened, and the gas in the combustion chamber 71 is ejected from the nozzle 102 in the third drive system 203 and acts on the turbine 205 and the turboshaft 206 in the nozzle 102 in the third drive system 203.

26. The turboshaft 206 in the nozzle 102 in the third drive system 203 drives the rotor on the axial flow compressor 68 in the fourth drive system 204 to rotate together. External air enters the combustion chamber 71 in the fourth drive system 204 from the gas outlet of the axial flow compressor 68 in the fourth drive system 204.

27. The seventh motor 5501 in the fourth drive system 204 is started to enable the insulating plate 63 to move downward.

28. The third motor 26 in the fourth drive system 204 is started to enable the gas outlet pipe 19 to move downward, and the natural gas in the natural-gas storage cylinder 72 overflows outward from the interior of the cylinder body 9 and enters the combustion chamber 71.

29. The seventh motor 5501 in the fourth drive system 204 is started to enable the insulating plate 63 to continuously move downward.

30. The electric ignition device 54 in the fourth drive system 204 ignites mixed gas in the combustion chamber 71.

31. The tenth motor 600 in the fourth drive system 204 is reversely started to enable the second bumper 52 to move to the right, so that the nozzle 102 in the fourth drive system 204 is opened. The gas in the combustion chamber 71 is ejected from the nozzle 102 in the fourth drive system 204 and acts on the turbine 205 and the turboshaft 206 in the nozzle 102 in the fourth drive system 204.

32. The turboshaft 206 in the nozzle 102 in the fourth drive system 204 drives the rotor on the axial flow compressor 68 in the first drive system 201 to rotate together. External air enters the combustion chamber 71 in the first drive system 201 from the gas outlet of the axial flow compressor 68 in the first drive system 201.

Parts which are not specially described in the above description belong to the prior art or can be realized through the prior art. Equivalent variations and modifications made in accordance with the content in the scope of the application patent of the present invention should be included in the technical scope of the present invention.

What is claimed is:

1. A turbocharged natural-gas engine, comprising:
a gas compressor, a first drive system, a second drive system, a third drive system and a fourth drive system;
wherein the first drive system comprises a natural-gas storage cylinder, an eighth motor, an axial flow compressor, a combustion chamber, a first safety device, a second safety device, an electric ignition device, a third drive device, a nozzle, a turbine and a turboshaft; the eighth motor is connected with the axial flow compressor, and the axial flow compressor is driven by the eighth motor; the turbine and the turboshaft are arranged in the nozzle and are fixedly connected with each other;

the gas compressor comprises an inner frame and a shell; the inner frame comprises an upper pressure plate, a double-layer cylinder plate and bearing plates; an interior of the upper pressure plate is hollow; a water inlet is formed in an upper part of the upper pressure plate; the double-layer cylinder plate comprises a first-layer cylinder plate and a second-layer cylinder plate; the first-layer cylinder plate is cylindrical and has an aperture smaller than the width of the upper pressure plate; the second-layer cylinder plate is cylindrical and has an aperture smaller than the aperture of the first-layer cylinder plate; the first-layer cylinder plate is sleeved outside the second-layer cylinder plate; a top of the first-layer cylinder plate of the double-layer cylinder plate is fixedly connected with a bottom of the upper pressure plate; a top of the second-layer cylinder plate is also fixedly connected with the bottom of the upper pressure plate; the first-layer cylinder plate and the second-layer cylinder plate are both hollow inside; a first gas inlet is formed in an upper part of the shell; a portion of a bottom of the shell protrudes downward to form a double-layer cylinder plate groove corresponding to the double-layer cylinder plate; the double-layer cylinder plate groove comprises a first-layer cylindrical plate groove and a second-layer cylindrical plate groove; the first-layer cylinder plate can move up and down in the first-layer cylindrical plate groove; the second-layer cylinder plate can move up and down in the second-layer cylindrical plate groove; a bearing plate is arranged in the first-layer cylindrical plate groove; the shape of the bearing plate in the first-layer cylindrical plate groove is in a ring shape; a top of the bearing plate in the first-layer cylindrical plate groove is fixedly connected with a bottom of the first-layer cylinder plate; the bearing plate in the first-layer cylindrical plate groove is hollow inside; a side surface of the bearing plate in the first-layer cylindrical plate groove is in close contact with an inner wall of the first-layer cylindrical plate groove; a bearing plate is also arranged in the second-layer cylindrical plate groove; the shape of the bearing plate in the second-layer cylindrical plate groove is a ring shape; the top of the bearing plate in the second-layer cylindrical plate groove is fixedly connected with a bottom of the second-layer cylinder plate; the bearing plate in the second-layer cylindrical plate groove is hollow inside; a side surface of the bearing plate in the second-layer cylindrical plate groove is in close contact with an inner wall of the second-layer cylindrical plate groove; a first gas outlet is also formed in the bottom of the shell; the inner frame is arranged in the shell; the side surface of the upper pressure plate is attached to the inner wall of the upper part of the shell; the first-layer cylinder plate, a portion of the upper pressure plate, a portion of the bearing plate in the first-layer cylindrical plate groove and a portion of the shell form a first auxiliary gas chamber in an enclosing manner; a portion of the bottom of the shell, the first-layer cylinder plate, the second-layer cylinder plate, a portion of the bearing plate in the first-layer cylindrical plate groove, a portion of the bearing plate in the second-layer cylindrical plate groove and a portion of the upper pressure plate form a second auxiliary gas chamber in the enclosing manner; and the second-layer cylinder plate, a portion of the bottom of the shell, a portion of the bearing plate in the second-layer cylindrical plate groove and a portion of the upper pressure plate form a main gas chamber in the enclosing manner;

the natural-gas storage cylinder comprises a cylinder body; a second gas inlet communicated with the first gas outlet is formed on a top of the cylinder body; the second gas inlet is internally provided with first threads and is provided with a threaded cover; an interior of the threaded cover is hollowed out to form a gas outlet pipe; a second gas outlet communicated with the gas outlet pipe is formed in a left part of the threaded cover; a third gear is arranged on an outer wall of an upper part of the threaded cover; the third gear is fixed to the outer wall of the upper part of the threaded cover; threads which are matched with the first threads in the second gas inlet are arranged on the outer wall of a lower part of the threaded cover; a second gas inlet cover is arranged below the threaded cover; a longitudinal cross-section of the second gas inlet cover has a "U" shape, and the second gas inlet cover is hollow inside; a first groove is formed in an upper part of a portion of the cylinder body at the periphery of the second gas inlet (11); a bottom end of the first gas outlet is arranged in the first groove; a second groove is formed in the upper part of a portion of the cylinder body near the first groove and is internally provided with second threads; and the cylinder body is hollow inside;

the gas compressor further comprises a first drive device configured to drive the upper pressure plate to move up and down and two second drive devices configured to drive the gas compressor to move up and down;

each one of the two second drive devices comprises a second motor, a second gear driven by the second motor, a second dowel bar which is fixed to the outer wall of the shell and has an "L" shape, and a second rack which is arranged on the second dowel bar; each second gear is engaged with the corresponding second rack; each second motor drives the corresponding second gear to rotate; each second drive device pushes the gas compressor upward after the gas compressor compresses gas so as to enable the bottom end of the first gas outlet of the gas compressor to be separated from the first groove;

a second gas inlet cover support which is used for supporting the second gas inlet cover is arranged near the second gas inlet cover; a top of the second gas inlet cover support is fixedly connected with a bottom of a portion of the cylinder body at the periphery of the second gas inlet; the second gas inlet cover support is hollow inside; the second gas inlet cover is arranged in the second gas inlet cover support; a cover groove which is matched with a portion of an upper part of the second gas inlet cover is formed in a lower part of a portion of the cylinder body at the periphery of the second gas inlet, and a portion of the upper part of the second gas inlet cover is able to move up and down in the cover groove; a third gas inlet which is communicated with an interior of the cylinder body is formed in a right part of the second gas inlet cover support; and a gas passage which is communicated with the interior of the cylinder body is formed in a bottom of the second gas inlet cover support;

an eighth gas inlet is formed in a left part of the combustion chamber; a ninth gas inlet is formed in a right part of the combustion chamber and is located on the lower right side of the eighth gas inlet; a gas outlet of the axial flow compressor is communicated with the eighth gas inlet; the natural-gas storage cylinder is communicated with the ninth gas inlet;

a first micro hole is formed in an upper part of the combustion chamber; the electric ignition device is arranged on the left side of the combustion chamber; an upper end of the nozzle is communicated with an interior of the combustion chamber; a small hole is formed in a right part of the nozzle and is provided with a control box; a regulation ingot is arranged in the control box; a left part of the control box is communicated with the nozzle; and a second micro hole is formed in a right part of the control box;

the third drive device comprises an insulating plate, a third dowel bar, a seventh motor, a seventh gear and a seventh rack; the seventh gear is engaged with the seventh rack; the seventh motor is geared with the seventh gear;

the seventh rack is arranged on the third dowel bar; the third dowel bar extends into the combustion chamber through the first micro hole; and a top of the insulating plate is fixedly connected with a bottom of the third dowel bar;

the second safety device comprises a tenth motor, an eleventh gear, an eleventh rack and a second bumper; the tenth motor is geared with the eleventh gear; the eleventh gear is engaged with the eleventh rack; the eleventh rack is arranged on the second bumper; the second bumper extends into the control box through the second micro hole; and a left part of the second bumper is fixedly connected with a right part of the regulation ingot;

the first safety device comprises a ninth motor, a ninth gear, an eighth rack and a first bumper; the ninth motor is geared with the ninth gear; the ninth gear is engaged with the eighth rack; and the eighth rack is arranged on the first bumper;

the structure of the second drive system is identical with the structure of the first drive system; the structure of the third drive system is identical with the structure of the first drive system; and the structure of the fourth drive system is identical with the structure of the first drive system; and the turboshaft in the first drive system is fixedly connected with a rotor on the axial flow compressor in the second drive system; the turboshaft in the second drive system is fixedly connected with a rotor on the axial flow compressor in the third drive system; the turboshaft in the third drive system is fixedly connected with a rotor on the axial flow compressor in the fourth drive system; and the turboshaft in the fourth drive system is fixedly connected with a rotor on the axial flow compressor in the first drive system.

* * * * *